(12) United States Patent
Dartnell

(10) Patent No.: US 9,677,473 B2
(45) Date of Patent: Jun. 13, 2017

(54) EXHAUST GAS TURBOCHARGER COUPLING ASSEMBLY

(71) Applicant: Ford Global Technologies, LLC, Dearborn, MI (US)

(72) Inventor: John Dartnell, Stanford-le-Hope (GB)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 14/606,914

(22) Filed: Jan. 27, 2015

(65) Prior Publication Data

US 2015/0226126 A1 Aug. 13, 2015

(30) Foreign Application Priority Data

Feb. 7, 2014 (GB) .................................... 1402093.7

(51) Int. Cl.
*F02D 23/00* (2006.01)
*F01N 1/00* (2006.01)
(Continued)

(52) U.S. Cl.
CPC ................. *F02C 7/20* (2013.01); *F02C 6/12* (2013.01); *F04D 25/024* (2013.01);
(Continued)

(58) Field of Classification Search
CPC .. F02C 7/20; F02C 6/12; F04D 25/024; F04D 29/403; F04D 29/4206; F04D 29/601;
(Continued)

(56) References Cited

U.S. PATENT DOCUMENTS 5,226,691 A * 7/1993 Kane ....................... B60B 35/02
                                                          301/130
5,228,726 A * 7/1993 Brown ..................... F16L 27/12
                                                          285/187
(Continued)

FOREIGN PATENT DOCUMENTS

DE          4205454 A1     8/1993
DE     102008029020 A1    12/2009
(Continued)

OTHER PUBLICATIONS

A machine translation Dumas Eric (Pub. No. FR 2897893 A1), published on Aug. 31, 2007.*
(Continued)

*Primary Examiner* — Thai Ba Trieu
(74) *Attorney, Agent, or Firm* — Julia Voutyras; McCoy Russell LLP

(57) ABSTRACT

An exhaust gas turbocharger coupling assembly configured to couple an exhaust gas turbocharger to an engine exhaust manifold is provided herein. The coupling assembly includes a first flange, the first flange being coupleable to either the engine exhaust manifold or the exhaust gas turbocharger; and one or more overhanging lips coupled to the first flange, the overhanging lips overhanging the first flange so as to define a slot between the first flange and the overhanging lip, where the slot is configured to receive a second flange associated with the other of the engine exhaust manifold or the exhaust gas turbocharger so as to restrict the first and second flanges moving apart when assembled.

16 Claims, 4 Drawing Sheets

(51) Int. Cl.
*F01D 25/26* (2006.01)
*F16L 23/00* (2006.01)
*F02C 7/20* (2006.01)
*F16L 23/032* (2006.01)
*F04D 29/40* (2006.01)
*F04D 29/60* (2006.01)
*F02C 6/12* (2006.01)
*F04D 25/02* (2006.01)
*F04D 29/42* (2006.01)

(52) U.S. Cl.
CPC ....... *F04D 29/403* (2013.01); *F04D 29/4206* (2013.01); *F04D 29/601* (2013.01); *F16L 23/032* (2013.01); *F05D 2220/40* (2013.01); *F05D 2230/60* (2013.01); *Y10T 29/49245* (2015.01)

(58) Field of Classification Search
CPC .. F05D 2220/40; F05D 2230/60; F01N 13/10; F16L 23/024; F16L 23/032; F16L 23/10; Y02T 29/49245
USPC ........ 60/602, 322–323; 415/158–164, 213.1; 285/405, 410
See application file for complete search history.

(56) References Cited

U.S. PATENT DOCUMENTS

| | | | | |
|---|---|---|---|---|
| 5,918,912 A * | 7/1999 | Keifel | ............... | F16L 23/032 285/124.1 |
| 6,688,103 B2 | 2/2004 | Pleuss et al. | | |
| 7,784,442 B2 * | 8/2010 | Lester | ............... | F01N 3/046 123/193.5 |
| 7,802,428 B2 * | 9/2010 | Perrin | ............... | F01N 5/02 60/602 |
| 8,215,113 B2 | 7/2012 | Hudson et al. | | |
| 8,544,267 B2 * | 10/2013 | Danielewicz | ............ | F01N 13/10 60/323 |
| 8,826,660 B2 * | 9/2014 | Gockel | ............... | F01N 13/10 60/323 |
| 9,181,848 B2 * | 11/2015 | Smith | ............... | F01N 13/10 60/323 |
| 2002/0070543 A1 * | 6/2002 | Aaron, III | ............ | F16L 23/003 285/23 |
| 2004/0046391 A1 * | 3/2004 | Vasudeva | ............ | F16L 23/032 285/368 |
| 2005/0268602 A1 * | 12/2005 | Smatloch | ............ | F16L 23/032 60/323 |
| 2010/0040465 A1 * | 2/2010 | Moran | ............... | F01N 13/1816 415/213.1 |
| 2011/0277466 A1 * | 11/2011 | Danielewicz | ............ | F01N 13/10 60/598 |
| 2013/0341919 A1 * | 12/2013 | Dzolovic | ............... | F16L 37/18 285/399 |
| 2014/0319830 A1 * | 10/2014 | Weidner | ............... | F01N 13/1805 285/368 |

FOREIGN PATENT DOCUMENTS

| | | | |
|---|---|---|---|
| EP | 1801362 A1 * | 6/2007 | ............ F01D 25/28 |
| FR | 2852624 A1 * | 9/2004 | ............ F01D 25/28 |
| FR | 2897893 A1 | 8/2007 | |
| FR | 2921696 A1 | 4/2009 | |
| GB | 2503212 A | 6/2012 | |
| WO | 2011113790 A1 | 9/2011 | |

OTHER PUBLICATIONS

A machine translation Hottebart Pascal et al. (Pub. No. FR 2921696 A1), published on Apr. 3, 2009.*
A machine translation Puschnik (Pub. No. WO 2011/113790 A1), published on Sep. 22, 2011.*
A machine translation Mayer Alexander et al. (Pub. No. DE 10 2008 029020 A1), published on Dec. 24, 2009.*
A machine translation Mikat Harald (Pub. No. DE 4 205 454 A1), published on Aug. 26, 1993.*

* cited by examiner

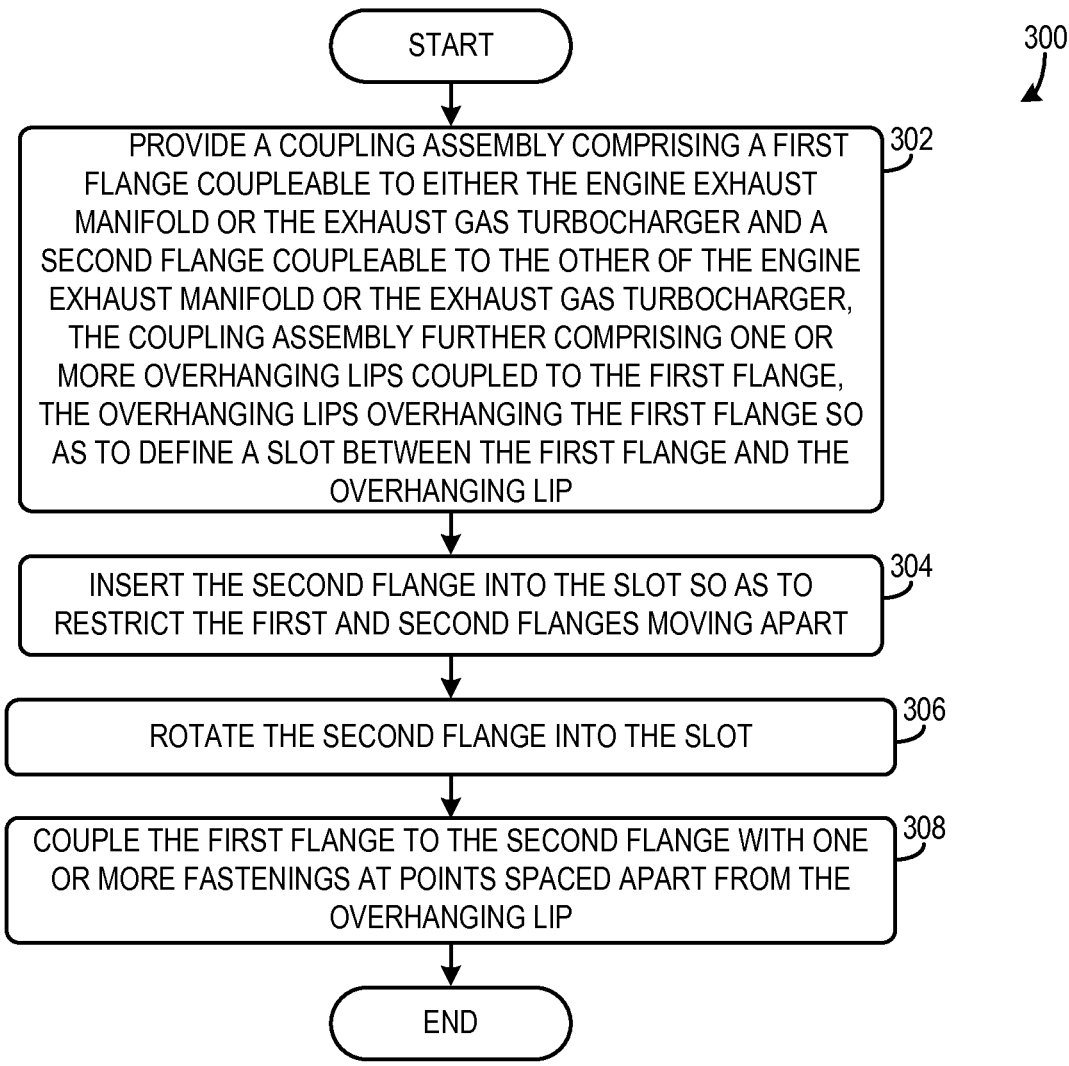

EXHAUST GAS TURBOCHARGER COUPLING ASSEMBLY

CROSS REFERENCE TO RELATED APPLICATIONS

The present application claims priority to Great Britain Patent Application No. 1402093.7, "AN EXHAUST GAS TURBOCHARGER COUPLING ASSEMBLY," filed Feb. 7, 2014, the entire contents of which are hereby incorporated by reference for all purposes.

FIELD

The present disclosure relates to an exhaust gas turbocharger coupling assembly and in particular to an exhaust gas turbocharger coupling assembly for a motor vehicle.

BACKGROUND AND SUMMARY

Turbochargers are used in engines to improve engine performance. Turbines in the turbocharger may be coupled to an exhaust manifold to enable the turbine to directly receive exhaust gas flow from the engine's exhaust system. However, it may be difficult to attach the turbine to the exhaust manifold due to packaging and tooling constraints. This issue is compounded by the modern desire to downsize engines. This means that the engine becomes more compact whilst the turbocharger increases in size. The engine cylinders may be forced closer together causing the manifold tooling access to be reduced and consequently reducing the turbocharger tooling access further. This issue is also a concern during service as a similar need for being able to remove the turbocharger without the removal of the manifold is also present. A crow's foot tool may be used to enable attachment between the turbine and the exhaust manifold. However, use of such a tool may be undesirable since it is difficult to reliably engage studs used to attach the turbine to the exhaust manifold or use an automatic run down tool.

The present disclosure seeks to address at least some of these issues. As such in one approach an exhaust gas turbocharger coupling assembly configured to couple an exhaust gas turbocharger to an engine exhaust manifold is provided. The coupling assembly includes a first flange, the first flange being coupleable to either the engine exhaust manifold or the exhaust gas turbocharger; and one or more overhanging lips coupled to the first flange, the overhanging lips overhanging the first flange so as to define a slot between the first flange and the overhanging lip, where the slot is configured to receive a second flange associated with the other of the engine exhaust manifold or the exhaust gas turbocharger so as to restrict the first and second flanges moving apart when assembled. The overhanging lip enables a portion of the coupling assembly to be engaged with the exhaust manifold without the use of fasteners (e.g., bolts, screws, etc.,) and fastener openings in a portion of the coupling assembly which may be difficult to access with tools, if desired. As a result, tooling of the coupling assembly may be simplified, thereby reducing manufacturing and repair costs.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

PRIOR ART

FIG. 2a shows a side sectional view of the assembly in an assembled state; FIG. 2b shows a perspective view of the first flange coupled to the manifold; and FIG. 2c shows a perspective view of the second flange; and FIG. 3 shows a method of coupling an exhaust gas turbocharger to an engine exhaust manifold.

DETAILED DESCRIPTION

Figure 1A:
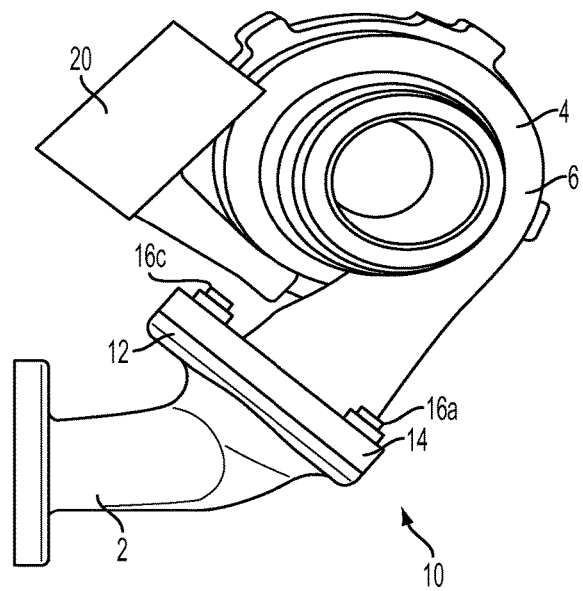
FIGS. 1a-1b show a previously-proposed exhaust gas turbocharger coupling assembly with FIG. 1a showing a side view and FIG. 1b showing a top view.
Figure 1B:
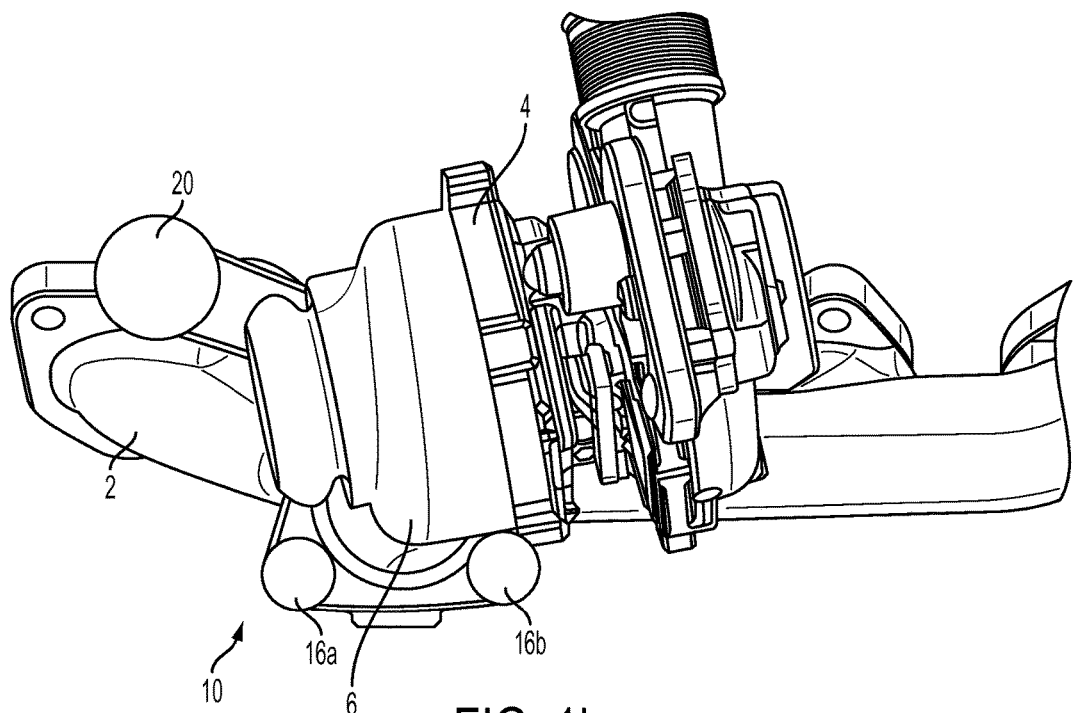

Prior art FIGS. 1a and 1b show a prior art exhaust gas turbocharger coupling assembly 10 configured to couple an engine exhaust manifold 2 and an exhaust gas turbocharger 4 together. The coupling assembly comprises a first flange 12 associated with the engine manifold 2 and a second flange 14 associated with the turbocharger 4. The first and second flanges 12, 14 are coupled together by virtue of three studs 16a, 16b, 16c, which are disposed about the periphery of the flanges.

During the assembly of the turbocharger 4 to the exhaust manifold 2, it is desirable to have line of sight tool access to the studs 16a, 16b, 16c once the turbocharger 4 is placed in position onto the manifold 2, for example to allow for a socket and a working tolerance around its perimeter. In this way, a socket on an extension bar, which may be part of an automatic run down tool, can be used to tighten the studs 16a, 16b, 16c without being impaired by the body of the manifold 2 or turbocharger 4. However, as depicted in prior art FIGS. 1a and 1b, the shape of the turbocharger turbine housing 6 and its functional orientation relative to the manifold 2 means that stud 16c is obscured from view by the turbocharger's shape. To overcome this, a crow's foot tool 20 may be used. However, use of such a tool is undesirable since it is difficult to reliably engage the out of sight stud 16c or use an automatic run down tool.

To overcome at least some of the problems of the prior art turbochargers shown in FIGS. 1a and 1b a novel turbocharger has been developed. Specifically with reference to FIGS. 2a-2c, the present disclosure relates to an exhaust gas turbocharger coupling assembly 100 configured to couple an exhaust gas turbocharger 4 to an engine exhaust manifold 2. The coupling assembly 100 and engine exhaust manifold 2 may be included in an engine 150 of a vehicle 152.

The coupling assembly 100 includes a first flange 112, which as depicted is coupled to the engine exhaust manifold 2, but may alternatively be coupled to the exhaust gas turbocharger 4. The coupling assembly 100 may further include a second flange 114, which as depicted is coupled to the exhaust gas turbocharger 4, but may alternatively be coupled to the engine exhaust manifold 2. It will be appreciated that the first and second flanges 112, 114 may be joined (e.g., welded, to the engine exhaust manifold 2 and exhaust gas turbocharger 4 respectively). Alternatively, the first and second flanges 112, 114 may be integral with at least portions of the engine exhaust manifold 2 and exhaust gas turbocharger 4 respectively.

The first and second flanges 112, 114 each include a passage 112a, 114a, which are aligned and provide a passage for exhaust gases from the exhaust manifold to flow to the turbocharger 4 (e.g., to a turbine of the turbocharger). The passages 112a, 114a may be provided centrally through the first and second flanges 112, 114. The first and second flanges 112, 114 include mating surfaces 112b, 114b which are arranged so that the first and second flanges 112, 114 may sealingly mate one another. Accordingly, a seal 116 may be provided between the first and second flanges 112, 114. The seal 116 may be disposed about the flow passages 112a, 114a and may be in the form of an annular ring.

The coupling assembly 100 further includes one or more overhanging portions or lips 120. In the particular example shown, there is one overhanging lip 120. The overhanging lips are coupled to and overhang the first flange 112. The overhanging lips 120 are provided on the perimeter of the first flange 112 and in the case of there being a plurality of overhanging lips, they may be distributed about a portion of the first flange perimeter. The overhanging lips 120 and the first flange 112 may be integral, however, the overhanging lips may alternatively be separate components that are joined (e.g., welded) to the first flange 112.

The overhanging lip 120 and the first flange 112 define a slot 122 between the first flange 112 and the overhanging lip 120. The overhanging lip 130 and hence slot 122 may extend in a direction that is parallel to a tangent of the flange perimeter and/or the passage 112a. The slot 122 receives the second flange 114 and in this way, the slot assists in holding the first and second flanges 112, 114 together. The slot 122 is sized to accommodate an edge of the second flange 114. In particular, the slot 122 may be sized to accommodate the second flange 114 when the first and second flanges are sealingly engaged.

The overhanging lip 120 may be coupled to the first flange 112 at a point on the first flange that is obscured from view by the exhaust gas turbocharger when installed. For example, the point at which the overhanging lip 120 is coupled to the first flange 112 may be obscured from view when viewed in a direction that is substantially perpendicular to the flange mating surfaces 112b, 114b and in a direction that passes through the point at which the overhanging lip 120 is coupled to the first flange. As will be apparent from FIG. 2b, the overhanging lip 120 may be coupled to the first flange 112 at a point that is closest to the engine exhaust manifold 2 and as such at a point that is closest to a cylinder head of an engine when installed.

The first and second flanges 112, 114 may be further coupled together with one or more fastenings at points spaced apart from the overhanging lip 120. For example, the first flange 112 may include one or more fastener openings 112c (e.g., for receiving bolts or studs 130). The second flange 114 may include corresponding fastener openings 114c for receiving the bolts or studs 130. The bolts or studs 130 may be tightened by corresponding nuts 132, which may bear down on the second flange 114. The first flange fastener openings 112c may be threaded to engage the threaded stud or bolt 130. Alternatively, the fastener openings 112c may not be threaded and the stud or bolt 130 may be held in place by virtue of a further nut or bolt head bearing down on the first flange 112. The fastener openings 112c, 114c may be distributed about the mating surfaces 112b, 114b of the first and second flanges 112, 114. The fastener openings 112c, 114c may be distributed about the central passage 112a, 114a. For example, the fastener openings and the overhanging lip 120 may be distributed substantially equiangularly about the center of passage 112a, 114a. In the particular example shown, there are two fastener openings and two corresponding fasteners.

Upon assembly, a portion of the second flange 114 may be inserted into the slot 120. In particular, the second flange 114 may be rotated into the slot 120. The first and second flanges 112, 144 may then be coupled together, for example with the one or more fastenings such as bolts/studs 130 and nuts 132.

Figure 2A:
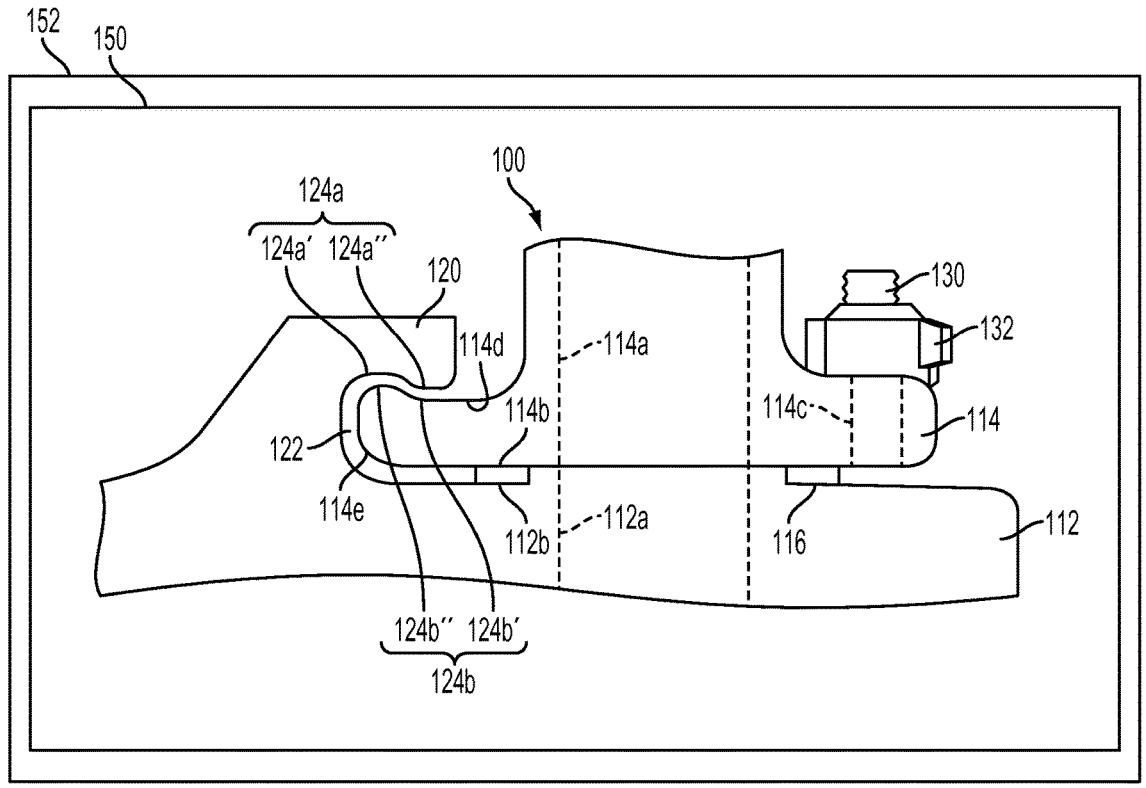
FIGS. 2a-2c show an exhaust gas turbocharger coupling assembly according to the present disclosure where
Figure 2B:
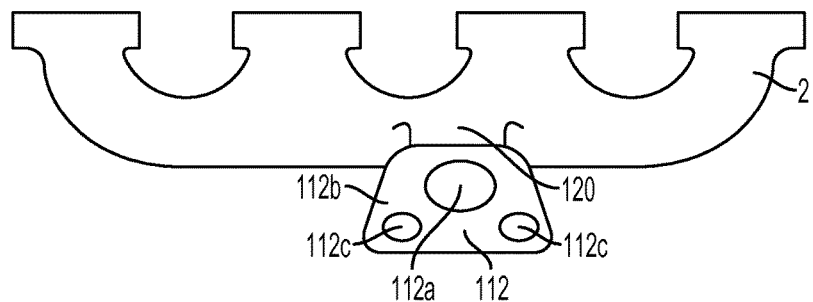
Figure 2C:
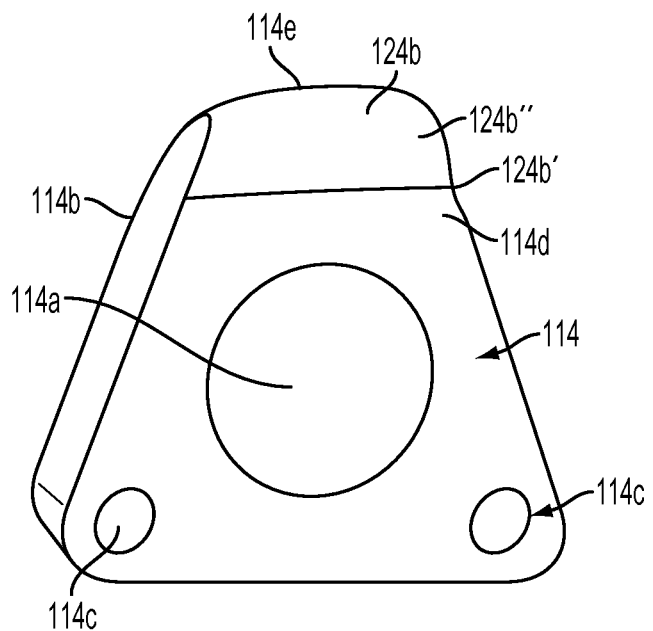

As depicted in FIG. 2a, the overhanging lip 120 may include a first cam surface 124a configured to engage a corresponding second cam surface 124b on the second flange 114. The first cam surface 124a may be positioned so as to face the first flange 112. Similarly, the second cam surface 124b may be positioned to face the overhanging lip 120 of the first flange 112 (e.g., to face the first cam surface 124a on the overhanging lip when installed). Accordingly, the second cam surface 124b may be provided on a back surface 114d of the second flange 114 (e.g., opposite the mating surface 114b).

As depicted in FIG. 2a, the first cam surface 124a may include a concave portion 124a' and a convex portion 124a". The concave portion 124a' may be provided at a radially outer position relative to the convex portion 124a", the radial direction being defined with respect to the center of passages 112a, 114a. Similarly, the second cam surface 124b may include a concave portion 124b' and a convex portion 124b". The concave portion 124b' may be provided at a radially inner position relative to the convex portion 124b". In an installed position, the first cam surface concave portion 124a' may engage the second cam surface convex portion 124b" and/or the first cam surface convex portion 124a" may engage the second cam surface concave portion 124b'. Although both the first and second cam surface 124a, 124b are shown as being profiled, it is also envisaged that one of the first and second cam surfaces may be substantially flat.

In a particular arrangement, the second cam surface concave portion 124b' may rotate about the first cam surface convex portion 124a" as the second flange is rotated into position. As the second flange 114 rotates the first cam surface concave portion 124a' may engage the second cam surface convex portion 124b". Any subsequent rotation of the second flange may consist of the second cam surface convex portion 124b" rotating about the first cam surface concave portion 124a'. When the first and second flanges are in the installed (e.g., sealed, position, etc.,) the first cam surface concave portion 124a' may remain engaged with the second cam surface convex portion 124b". By contrast, the first cam surface convex portion 124a" may no longer be engaged with the second cam surface concave portion 124b' in the installed position (although it is also envisaged that first cam surface convex portion 124a" may still engage the second cam surface concave portion 124b' in the installed position).

The second flange 114 may include a curved edge 114e on the radially outer edge of the mating surface 114b. The curved edge 114e may facilitate rotation of the second flange 114 in the slot 122.

The first and second cam surfaces 124a, 124b may be configured such that, upon tightening the one or more fastenings, the second flange 114 may move (e.g., rotate) relative to the overhanging lip 120 so as to increase the compressive load between the first and second flanges 112, 114 at the point where the overhanging lip is provided. In particular, the first and second cam surfaces 124a, 124b may be configured such that upon tightening the one or more fastenings, the second flange 114 may move relative to the overhanging lip 120 so as to apply an evenly distributed compressive load between the first and second flanges 112, 114. Accordingly, the compressive load between the first and second flanges 112, 114 at the point where the overhanging lip 120 is provided may be substantially equal to the compressive load at the one or more fastenings. The fastenings may apply a predetermined compressive load to the first and second flanges 112, 114 (e.g., when a pre-determined torque is applied to a bolt/stud 130 or nut 132). The first and second cam surfaces 124a, 124b may be configured such that the same predetermined compressive load applies at the point at which the overhanging lip 120 is coupled to the first flange 112.

Furthermore, the first cam surface 124a may be configured such that the interaction with the second cam surface 124b on the second flange 114 may ensure alignment between the first and second flanges, for example, during assembly and/or thermal growth/reduction of the components. In particular, if the first and second flanges 112, 114 expand radially (e.g., due to temperature increases during operation of the engine) the interaction between the first and second cam surfaces 124a, 124b may assist in maintaining the relative position of the first and second flanges. For example, the first cam surface 124a may radially pull the second cam surface 124b and thus the second flange 114.

FIG. 3 shows a method 300 of coupling an exhaust gas turbocharger to an engine exhaust manifold. The method 300 may be implemented via the engine systems and components discussed above with regard to FIGS. 2a-2c or may be implemented via other suitable engine systems and components.

At 302 the method includes providing a coupling assembly comprising a first flange coupleable to either the engine exhaust manifold or the exhaust gas turbocharger and a second flange coupleable to the other of the engine exhaust manifold or the exhaust gas turbocharger, the coupling assembly further comprising one or more overhanging lips coupled to the first flange, the overhanging lips overhanging the first flange so as to define a slot between the first flange and the overhanging lip.

Next at 304 the method includes inserting the second flange into the slot so as to restrict the first and second flanges moving apart. At 306 the method may include rotating the second flange into the slot and at 308 the method may include coupling the first flange to the second flange with one or more fastenings at points spaced apart from the overhanging lip.

Advantageously, the coupling assembly disclosed herein may not need additional tooling, such as a crow's foot tool, to enable engagement between the flanges at a point that would otherwise be inaccessible or obscured from view.

The subject matter of the present disclosure is further described in the following paragraphs. According to one aspect an exhaust gas turbocharger coupling assembly configured to couple an exhaust gas turbocharger to an engine exhaust manifold is provided. The coupling assembly comprising: a first flange, the first flange being coupleable to either the engine exhaust manifold or the exhaust gas turbocharger; and one or more overhanging lips coupled to the first flange, the overhanging lips overhanging the first flange so as to define a slot between the first flange and the overhanging lip, where the slot is configured to receive a second flange associated with the other of the engine exhaust manifold or the exhaust gas turbocharger so as to restrict the first and second flanges moving apart when assembled.

In this aspect, the overhanging lip may comprise a first cam surface configured to engage a corresponding second cam surface on the second flange. The first cam surface may be positioned so as to face the first flange. The overhanging lip and the first flange may be integral.

In this aspect, the first cam surface may be configured such that the interaction with the second cam surface on the second flange may enable alignment between the first and second flanges, for example, during assembly and/or thermal growth of the components.

In this aspect, the overhanging lip may be coupled to the first flange at a point that is obscured from view by the exhaust gas turbocharger when installed. For example, the point at which the overhanging lip is coupled to the first flange may be obscured from view when viewed in a direction that is substantially perpendicular to the first flange and in a direction that passes through the point at which the overhanging lip is coupled to the first flange. The overhanging lip may be coupled to the first flange at a point that is closest to a cylinder head of an engine when installed.

In this aspect, the first flange may be further configured to be coupled to the second flange with one or more fastenings at points spaced apart from the overhanging lip. For example, the first flange may comprise one or more fastener openings, e.g. for receiving bolts or studs. The second flange may comprise corresponding fastener openings for receiving the bolts or studs. The fastener openings may be distributed about the first and second flanges. The first and second flanges may each comprise a central passage which provides a passage for exhaust gases from the exhaust manifold to flow to the turbocharger. The fastener openings may be distributed about the central passage.

In this aspect, the first cam surface may be configured such that, upon tightening the one or more fastenings, the second flange may move relative to the overhanging lip so as to increase the compressive load between the first and second flanges at the point where the overhanging lip is provided.

In this aspect, the coupling assembly may further comprise the second flange. The second flange may comprise the second cam surface. The second cam surface may be positioned to face the overhanging lip of the first flange, e.g., face the first cam surface on the overhanging lip, when installed.

In this aspect, the first and second cam surfaces may be configured such that, upon tightening the one or more fastenings, the second flange may move relative to the overhanging lip so as to increase the compressive load between the first and second flanges at the point where the overhanging lip is provided. In particular, the first and second cam surfaces may be configured such that upon tightening the one or more fastenings, the second flange may move relative to the overhanging lip so as to apply an evenly distributed compressive load between the first and second flanges. Accordingly, the compressive load between the first and second flanges at the point where the overhanging lip is provided may be substantially equal to the compressive load at the one or more fastenings. The fastenings may apply a predetermined compressive load to the first and second flanges, e.g. when a pre-determined torque is applied to a bolt or stud. The first and second cam surfaces may be configured such that the same predetermined compressive load applies at the point at which the overhanging lip is coupled to the first flange.

According to a second aspect of the present disclosure there is provided an exhaust gas turbocharger coupling assembly configured to couple an exhaust gas turbocharger to an engine exhaust manifold, the coupling assembly comprising a second flange, the second flange being coupleable to either the engine exhaust manifold or the exhaust gas turbocharger, the second flange being configured to engage a first flange, the first flange being coupleable to the other of the engine exhaust manifold or the exhaust gas turbocharger. The second flange may comprise a second cam surface. The second cam surface may be positioned to face an overhanging lip of the first flange when installed.

In this aspect, a vehicle and/or engine may comprise the above-mentioned exhaust gas turbocharger coupling assembly.

According to a third aspect of the present disclosure there is provided a method of coupling an exhaust gas turbocharger to an engine exhaust manifold, the method comprising: providing a coupling assembly comprising a first flange coupleable to either the engine exhaust manifold or the exhaust gas turbocharger and a second flange coupleable to the other of the engine exhaust manifold or the exhaust gas turbocharger, the coupling assembly further comprising one or more overhanging lips coupled to the first flange, the overhanging lips overhanging the first flange so as to define a slot between the first flange and the overhanging lip, and inserting the second flange into the slot so as to restrict the first and second flanges moving apart.

In this aspect, the method may further comprise rotating the second flange into the slot. The method may further comprise coupling the first flange to the second flange with one or more fastenings at points spaced apart from the overhanging lip.

It will be appreciated by those skilled in the art that although the invention has been described by way of example with reference to one or more examples, it is not limited to the disclosed examples and that alternative examples could be constructed without departing from the scope of the invention as defined by the appended claims.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily needed to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of coupling an exhaust gas turbocharger to an engine exhaust manifold, the method comprising:
   providing a coupling assembly comprising a first flange coupleable to the engine exhaust manifold, a second flange coupleable to the exhaust gas turbocharger, and fasteners for coupling the first flange to the second flange, the coupling assembly further comprising an overhanging lip coupled to the first flange, the overhanging lip overhanging the first flange so as to define a slot between the first flange and the overhanging lip,
   inserting the second flange into the slot so as to restrict the first and second flanges moving apart, the overhanging lip including a portion that extends towards a mating surface of the first flange and the second flange, and the overhanging lip including a portion that extends away from the mating surface of the first flange and the second flange, and
   tightening the fasteners to increase a compressive load between the overhanging lip and the second flange.

2. The method of claim 1, where the second flange includes a curved edge that extends in a direction away from the mating surface of the second flange and away from the first flange toward the overhanging lip when the first and second flanges are coupled.

3. A turbocharger coupling shaped to mate to an exhaust manifold, comprising:
   a second flange engaging a first flange;
   where a portion of the second flange comprises a second cam surface being positioned to face an overhanging lip of the first flange when installed,
   where the portion of the second flange positioned to face the overhanging lip includes a curved edge that extends in a direction away from a mating surface of the first flange and the second flange and away from the first flange towards the overhanging lip coupled to the first flange when the first flange is coupled to the second flange,
   where the overhanging lip includes a portion that extends away from the mating surface of the first flange and the second flange and a portion that extends towards the mating surface of the first flange and the second flange, and
   where the curved edge of the portion of the second flange positioned in the overhanging lip transitions into the mating surface.

4. The turbocharger coupling of claim 3, where the turbocharger coupling is an exhaust gas turbocharger coupling assembly positioned in an engine of a vehicle, and where the second flange is coupled to one, but not the other of the exhaust manifold or a turbocharger, and the first flange is coupled to the other of the exhaust manifold or the turbocharger;

further comprising fasteners for coupling the second flange to the first flange; and further comprising tightening the fasteners to increase a compressive load between the overhanging lip and the curved edge.

5. An exhaust gas turbocharger coupling assembly configured to couple an exhaust gas turbocharger to an engine exhaust manifold, the coupling assembly comprising:

a first flange, the first flange being coupleable to the engine exhaust manifold; and an overhanging lip coupled to the first flange, the overhanging lip overhanging the first flange so as to define a slot between the first flange and the overhanging lip;

where the slot is configured to receive a portion of a second flange associated with the exhaust gas turbocharger so as to restrict the first and second flanges moving apart when assembled, where the portion of the second flange received by the slot includes a curved edge that extends in a direction away from a mating surface of the first flange and the second flange and toward the overhanging lip when the first and second flanges are coupled, where the overhanging lip includes a convex portion that extends towards the mating surface of the first flange and the second flange, and where the overhanging lip includes a concave portion that extends away from the mating surface of the first flange and the second flange, where a side of the second flange opposite the portion of the second flange received by the slot is coupled to the first flange via a fastener; and where the curved edge of the second flange transitions into the mating surface.

6. The exhaust gas turbocharger coupling assembly of claim 5, where the convex portion of the overhanging lip is a part of a first cam surface configured to engage a corresponding second cam surface on the second flange, and where the first cam surface is positioned so as to face the first flange;

and further comprising tightening the fastener to couple the first flange to the second flange and increase a compressive load between the overhanging lip and the curved edge of the second flange.

7. The exhaust gas turbocharger coupling assembly of claim 6, where the first cam surface is configured such that the interaction with the second cam surface on the second flange enables alignment between the first and second flanges.

8. The exhaust gas turbocharger coupling assembly of claim 6, where the overhanging lip is coupled to the first flange at a point that is closest to a cylinder head of an engine when installed.

9. The exhaust gas turbocharger coupling assembly of claim 6, where the first flange is further configured to be coupled to the second flange with one or more fastenings at points spaced apart from the overhanging lip.

10. The exhaust gas turbocharger coupling assembly of claim 9, where the first cam surface is configured such that, upon tightening the one or more fastenings, the second flange moves relative to the overhanging lip so as to increase the compressive load between the first and second flanges at the point where the overhanging lip is provided.

11. The exhaust gas turbocharger coupling assembly of claim 9, where the second flange comprises the second cam surface, where the second cam surface is positioned to face the overhanging lip of the first flange when installed.

12. The exhaust gas turbocharger coupling assembly of claim 11, where the first and second cam surfaces are configured such that, upon tightening the one or more fastenings, the second flange moves relative to the overhanging Hp so as to increase the compressive load between the first and second flanges at the point where the overhanging lip is provided.

13. The exhaust gas turbocharger coupling assembly of claim 5, where the overhanging lip is coupled to the first flange at a point that is obscured from view by the exhaust gas turbocharger when installed.

14. The exhaust gas turbocharger coupling assembly of claim 5, where the overhanging lip and the first flange are integral.

15. The exhaust gas turbocharger coupling assembly of claim 5, where the exhaust as turbocharger coupling assembly is included in an engine, and the slot in which the second flange is restrained by the overhanging lip and the first flange.

16. The exhaust gas turbocharger coupling assembly of claim 15, where the engine is included in a vehicle.

* * * * *

UNITED STATES PATENT AND TRADEMARK OFFICE
CERTIFICATE OF CORRECTION

PATENT NO.         : 9,677,473 B2
APPLICATION NO.    : 14/606914
DATED              : June 13, 2017
INVENTOR(S)        : John Dartnell Page 1 of 1

It is certified that error appears in the above-identified patent and that said Letters Patent is hereby corrected as shown below:

In the Claims

Column 10, Line 29, Claim 12, "Hp" should read "lip".

Column 10, Line 40, Claim 15, "as" should read "gas".

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*